(12) United States Patent
Dietz et al.

(10) Patent No.: US 7,167,354 B2
(45) Date of Patent: Jan. 23, 2007

(54) MESOPOROUS CARBONS AND POLYMERS FROM HYDROXYLATED BENZENES

(75) Inventors: Steven Dietz, Denver, CO (US); Vinh The Nguyen, Lakewood, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 901 days.

(21) Appl. No.: 10/075,019

(22) Filed: Feb. 12, 2002

(65) Prior Publication Data

US 2003/0153636 A1 Aug. 14, 2003

(51) Int. Cl.
*H01G 9/00* (2006.01)

(52) U.S. Cl. ............... 361/504; 361/502; 361/512; 361/516; 361/523; 361/525; 521/63; 521/64; 521/99

(58) Field of Classification Search ........ 361/502–504, 361/508–512, 516–534; 521/63–64, 99
See application file for complete search history.

(56) References Cited

U.S. PATENT DOCUMENTS

| | | | |
|---|---|---|---|
| 4,756,898 A | 7/1988 | Hopper et al. ............. 423/449 |
| 4,806,290 A | 2/1989 | Hopper et al. ............. 264/28 |
| 4,873,218 A | 10/1989 | Pekala ............. 502/64 |
| 4,997,804 A | 3/1991 | Pekala ............. 502/418 |
| 5,081,163 A | 1/1992 | Pekala ............. 521/187 |
| 5,086,085 A | 2/1992 | Pekala ............. 521/187 |
| 5,402,306 A | 3/1995 | Mayer et al. ............. 361/502 |
| 5,476,878 A | 12/1995 | Pekala ............. 521/61 |
| 5,556,892 A | 9/1996 | Pekala ............. 521/181 |
| 6,024,899 A * | 2/2000 | Peng et al. ............. 264/29.1 |
| 6,297,293 B1 | 10/2001 | Bell et al. ............. 521/99 |
| 6,515,845 B1 * | 2/2003 | Oh et al. ............. 361/502 |
| 6,696,258 B1 * | 2/2004 | Wei et al. ............. 435/7.2 |
| 2004/0024074 A1 * | 2/2004 | Tennison et al. ............. 521/99 |

OTHER PUBLICATIONS

A. Monnier, et al; *Cooperative Formation of Inorganic-Organic Interfaces in the Synthesis of Silicate Mesostructures*; Science, vol. 261, Sep. 3, 1993 (pp. 1299-1303).
John M. Thomas; *The Chemistry of Crystalline Sponges*; Nature, vol. 368, Mar. 24, 1994 (pp. 367-368).
Olsheng Huo, et al; *Generalized Synthesis of Periodic Surfactant/ Inorganic Composite Materials*; Nature, vol. 368, Mar. 24, 1994; (pp. 317-319).
C. T. Kresge, et al; *Ordered Mesoporous Molecular Sieves Synthesized by a Liquid-Crystal Template Mechanism*; Nature, vol. 359, Oct. 22, 1992; (pp. 710-712).
William R. Even, Jr., et al *Emulsion-Derived Foams: Preparation, Properties, and Application*; Mrs Bulletin Apr. 1994; (pp. 29-33).
J. S. Beck; *Molecular or Supramolecular Templating: Defining the Role of Surfactant Chemistry in the Formation of Microporous and Mesoporous Molecular Sieves*; American Chemical Society; Chem. Mater. vol. 6, No. 10, 1994; (pp. 1816-1821).

(Continued)

*Primary Examiner*—Nguyen T. Ha
(74) *Attorney, Agent, or Firm*—Conley Rose, P.C.

(57) ABSTRACT

A mesoporous polymer and method of preparing a mesoporous polymer whose polymerization kinetics are dependent upon pH and whose pore size is controlled by pH and solvent concentration are disclosed. The polymer is optionally pyrolyzed to form a primarily carbonaceous solid. The material has an average pore size in the mesopore range and is suitable for use in liquid-phase surface limited applications including chromatographic, sorbent, catalytic, and electrical applications.

28 Claims, 5 Drawing Sheets

Schematic of ultracapacitor device.

OTHER PUBLICATIONS

R. R. Lagasse, et al; *High Surface Area, High Permeability Carbon Monoliths*; Organic Materials Processing Dept., Sandia National Laboratories, Albuquerque, NM; 1994; (pp. 7).

J. D. LeMay, et al; *Low-Density Microcellular Materials*; MRS Bulletin/Dec. 1990; (pp. 19-45).

R. W. Pekala, et al; *Carbon Aerogels: An Update on Structure, Properties, and Applications*; Lawrence Livermore National Laboratory; 1994; (pp. 369-377).

R. W. Pekala, et al; *Aerogels Derived From Multifunctional Organic Monomers*; Elsevier Science P{ublication B.V. 0022-3093 1992 (pp. 90-98).

D. Myers; *Surfactant Science and Technology*; VCH Publishers; 1846; (pp. 172-177.

V. Luca, et al; *Synthesis and Characterization of Mesostructured Vanadium Oxide*; American Chemical Society, 1995; Chem. Mater. 1995, (pp. 2220-2223).

S. Bagshaw, et al; *Templating of Mesoporous Molecular Sieves by Nonionic Polyethylene Oxide Surfactants*; Science, vol. 269, Sep. 1, 1995; (pp. 1242-1244).

J. S. Beck, et al; *A New Family of Mesoporous Molecular Sieves Prepared with Liquid Crystal Templates*; J. Am. Chem. Soc. 1992; (pp. 10834-10843).

Hans Dressler., *Resorcinol, Its Uses and Derivatives*, Plenum Press; 1994 (pp. 85-125, pp. 437451-.

H. Tamon, et al., *Control of Mesoporous Structure of Organic And Carbon Aerogels*, Pergamon 1998, Carbon vol. 36, No. 9 pp. 1257-1262).

* cited by examiner

Structure of RF polymer.

Nitrogen Isotherm (W/R = 0.38)

Nitrogen Pore Size Distribution (W/R = 0.38)

Pore Size as a Function of Water Over Resorcinol Weight Ratio

Representation of the change in the structure of a porous carbon before and after activation.

Schematic of ultracapacitor device.

MESOPOROUS CARBONS AND POLYMERS FROM HYDROXYLATED BENZENES

STATEMENT REGARDING FEDERALLY SPONSORED RESEARCH OR DEVELOPMENT

This work was funded in part by the National Science Foundation, Contract No. DMI-9901792.

CROSS-REFERENCE TO RELATED APPLICATIONS

Not Applicable.

TECHNICAL FIELD OF THE INVENTION

The present invention relates generally to mesoporous organic polymers that are useful as chromatographic supports and more particularly to mesoporous carbon structures that are useful as electrodes, catalyst supports and sorbents.

BACKGROUND OF THE INVENTION

Mesoporous Materials

A material whose molecular structures allow fluid flow through the material is porous. Porous materials can be characterized by their pore sizes. Very small pores having diameters less than 2 nanometers (nm) are called micropores, while very large pores having diameters greater than 50 nm are called macropores. Microporous materials offer a large surface area per volume of material but the micropores are too small to be readily accessible to liquids. In contrast, macropores are large enough to afford ready access to liquids but afford smaller surface areas relative to equivalent volumes of smaller pore materials. Pores of intermediate size—i.e., those having diameters between 2 and 50 nm—are called mesopores and form the subject of the present invention. One aspect of mesoporous materials is that they offer greater liquid access than micropores and greater surface area per unit volume than macropores. Consequently, mesoporous materials provide liquid access to more surface area per unit volume of material than either microporous or macroporous materials. As used herein, the term "mesopore" will be used to refer to pores in the desired size range, namely to pores having diameters between approximately 2 and 50 nm.

Uses for Mesoporous Materials

Because of their large liquid-accessible surface areas, mesoporous materials are useful in many liquid phase applications, including as sorbents, electrical materials and catalyst and chromatographic supports. In the field of catalysis, reactions typically occur at surfaces—i.e., the surface of the catalyst serves as an active site for the combination or separation of reactive species and the available surface area therefore limits reaction rates. Catalytic reactions can occur in the gas or liquid phase; in either case, it is desirable to maximize the amount of catalyst surface area; the larger the surface area of catalyst, the greater the number of active sites and the faster the rate of the reaction. One common way to increase surface area is to provide the catalyst as a thin coating on the surface of a high surface area support material. The support material provides the structure for the catalyst and thus determines its shape and the amount of surface area per unit volume. Hence, the porosity and surface area of the support become rate-limiting factors for the catalytic reaction. Mesoporous materials provide optimal support structures for certain catalytic systems because they provide both high surface area and liquid accessibility.

Another application in which a mesoporous polymer is advantageous is in high performance liquid chromatography (HPLC), a technique commonly used for separating and quantifying the constituents of a mixture. HPLC is often used to separate chemicals and biological molecules that have very similar properties and are difficult if not impossible to separate by other conventional means. One fundamental limitation of HPLC is that, because the columns are packed with small porous beads, the high flow rates required to maximize the throughput in preparatory scale separations result in channeling of the solution around the particles, rather than through the pores. This, in turn, impedes the separation. Because separation is a major cost of chemical processing, the development of high capacity monolithic columns could greatly reduce the cost of manufacturing pharmaceuticals and their precursors. The mesoporous polymers described herein may be prepared by polymerization within a suitable structure (e.g., a glass or metal tube) to form a stationary phase for chromatography.

Pore size is also an important aspect of sorbent technology. This technology involves the sorption of a sorbate in the liquid or gas phase into a solid phase sorbent. The liquid phase can comprise either a solvent containing a dissolved sorbate or an emulsion or other mixture of two liquids, one of which is the sorbate. Examples of common sorbents currently include polymers and carbons in powdered, granular, and pelletized form. These are used in environmental applications associated with energy production, by-product recoveries, and waste incineration, as well as water purification and wastewater cleanup. An example of a sorbent application that involves a gas phase is air purification. A variety of other uses are known or are being developed. For each desired application, the sorbent is selected such that the sorbent has an affinity for the sorbate species, which is attracted into the solid and held there by one of various surface mechanisms. The efficacy of a sorbent material depends on how much sorbate it can attract and retain. Hence, the pore size and available surface area are critical in this context as well.

Certain electrical applications also involve liquid phase, surface-limited reactions. One example of such an application is an ultracapacitor. Like batteries, ultracapacitors are energy storage devices. Ultracapacitors are notable for their ability to store and deliver energy at high power densities, and to be cycled virtually indefinitely without degradation. In contrast, batteries store large amounts of energy, but function most efficiently at low power densities and degrade quickly if they are repeatedly cycled. The characteristics of ultracapacitors make them particularly suitable to meet the power requirements of various emerging technologies, including electric vehicles, electronics (cellular telephones, and digital communications) and clean power (uninterrupted power sources, filters, etc.).

An ultracapacitor typically comprises a pair of electrodes separated by a non-conductive porous separator. The space between the electrodes is filled with a liquid electrolyte, which can be either aqueous or organic. Because no chemical reactions occur during the charge/discharge cycle, capacitors can be cycled many times without degradation, unlike batteries. Unfortunately, though, conventional ultracapacitors lacked sufficient energy storage capacity to be commercially practical. One key to improving the energy storage capacity of ultracapacitors is to optimize the interaction between the electrodes and the electrolyte.

There are two major categories of electrolytes for double layer devices: aqueous and organic, each of which has advantages and disadvantages. Aqueous electrolytes such as potassium hydroxide and sulfuric acid offer low electrical resistance (0.2 to 0.5 ohms/cm$^2$) and can therefore be charged and discharged very quickly. However, they can only be cycled through a potential range of approximately one volt due to the generally low breakdown voltages of aqueous electrolytes; this sharply limits their energy storage density, which is proportional to the square of the voltage. Organic electrolytes such as propylene carbonate offer breakdown voltages of up to three volts and therefore have energy storage densities as much as nine times higher than those of aqueous electrolytes. However, due to their much higher electrical resistance of 1–2 ohms/cm$^2$, organic electrolytes reduce the speed with which capacitors can be cycled. The type of electrolyte that is desirable depends on the nature of the application.

The mechanism for energy storage devices of this type is based on the double-layer capacitance at a solid/liquid interface. More specifically, double-layer ultracapacitors typically consist of high surface area carbon structures that store energy in a polarized liquid layer. The polarized liquid layer forms at the interface between an ionically conducting liquid electrolyte and an electronically conducting electrode, namely the carbon structure. As illustrated in FIG. 1, the separation of charge in the ionic species at the interface (called a double layer) produces a standing electric field. Thus, the capacitive layer, while only a few angstroms thick, has a very large area. The larger the area of the solid/liquid interface, the more energy can be stored. Hence, the capacitance of this type of capacitor is proportional to the surface area of the electrode.

At the same time, electrodes having pores smaller than about 2 nm do not exhibit increased capacitance. It is believed that pores smaller than about 2 nm are too small to allow entry of most nonaqueous electrolytes and therefore cannot be fully wetted, with the result that a portion of the potential interface area is not realized. Hence, it is believed that mesoporous materials are optimal for use in this type of capacitor.

While some carbon structures having pore sizes in the mesoporous range have been extensively investigated for use in ultracapacitors because of their low cost and potential for high-energy storage densities, none of them has proved entirely satisfactory. Since the capacitance of the material increases linearly with the specific surface area, a carbon material with a capacitance of 20 µF/cm$^2$ and a surface area of 1000 m$^2$/g would have a capacitance of 200 F/g if all of the surface area were electrochemically accessible. However, since high surface area porous carbons typically have a high fraction of micropores, only a fraction of the surface of the carbon is effectively utilized—i.e., wetted. Therefore, most of the electrode surface area does not contribute to the double-layer capacitance and the measured capacitance values of prior carbon structures are therefore only about 20 percent of theoretical. For carbon-based ultracapacitors to approach their theoretical performance, they should have a high pore volume (>50%) and a high fraction of continuous pores with diameters greater than 2 nm to allow the electrolyte access to the carbon surface.

In sum, the major drawbacks of the carbons now used in double-layer ultracapacitors are: low capacitance (due to pores that are too large to offer high surface area or too small to offer liquid access), and high costs (due to materials and processing costs).

Manufacture of Mesoporous Carbon-Based Materials

One well understood polymeric system is the resorcinol/formaldehyde ("RF") system (see FIG. 2), which is a member of the hydroxylated benzene/aldehyde polymer family. During the polymerization, resorcinol serves as a trifunctional monomer capable of adding formaldehyde in the 2, 4, and 6 positions of the resorcinol aromatic ring. The resorcinol monomer is particularly reactive because of the electron-donating effects of the attached hydroxyl groups. In solution, the substituted resorcinol rings condense with each other to form clusters. In previous work, an alkaline salt such as $Na_2CO_3$ or $K_2CO_3$ is added to catalyze this reaction and it has been shown that the size of the polymer clusters is regulated by the catalyst concentration in the RF solution (Tamon et al. 1998). Increasing basicity results in smaller polymer clusters. The catalyst concentration is typically listed in terms of R/C, which is the molar concentration of resorcinol, or its functional equivalent, divided by the molar concentration of catalyst.

In order to introduce larger pores into polymers, and thus increase their porosity, several groups have prepared polymeric gels, such as RF gels, in liquid emulsions. The term "gel" means only that a process such as polymerization has occured in a liquid mixture causing the mixture to become more viscous or, in some cases, to become a solid. Such RF gels usually have a mixture of pore sizes, and both the polymers and the carbons formed therefrom by pyrolysis are mostly macroporous (i.e., having diameters greater than 50 nm) rather than mesoporous (LeMay et al. 1990, Even and Gregory 1994). An alternative approach uses aerogels, which are gels dried by supercritical fluid processing. Supercritical fluid processing is known to minimize shrinkage and pore collapse on drying, but is a relatively expensive processing technique.

It is well known that many polymers, including RF polymers and other thermoset polymers, can be pyrolyzed to yield carbon materials. The term "carbon materials" means materials that consist primarily of the element carbon and have properties associated with graphite, such as a useful level of electrical conductivity. Pyrolysis of polymer aerogels prepared by supercritical fluid extraction of RF gels produces carbons with a mixture of meso- and micropores (Pekala et al. 1994). However, because of the need for supercritical extraction, these carbon aerogels are very expensive to make. Hence, an effective method for producing a mesoporous carbon that does not involve supercritical fluid extraction is particularly desirable.

In U.S. Pat. No. 6,297,293, we described a novel method for producing mesoporous carbon using surfactants and a carbon-based polymer system without the need for supercritical fluid extraction. In this method, surfactant micelles serve as a template around which polymerization of carbon-based pre-polymers takes place. Following polymerization, the surfactant is removed, leaving pores whose size depends on the physical dimensions of the micelles. Although this technique allows control of pore size through proper surfactant selection, a significant drawback is the inherent requirement for surfactants, which are relatively expensive and therefore add significantly to the overall cost.

RF gels prepared at higher catalyst concentrations are transparent. It is also known that at high catalyst concentrations (e.g. R/C=50), the RF polymerization produces polymers that upon drying (either conventional or supercritical) have a large proportion of micropores. This observation has been attributed to initially very small polymer structure consisting of an assemblage of roughly spherical particles. The space between these particles is related to the size of the particles. Just as a stack of bowling balls would give larger crevices than a stack of golf balls, so too would a mass of larger polymer particles be expected to yield larger spaces between particles. The spaces between particles act as pores that allow the entrance of fluids into the polymer. Other factors being equal, polymers consisting of larger particles should have larger pores, and upon pyrolysis should yield carbons with larger pores.

The catalyst concentration also determines the pH of the reaction mixture and transparent gels are prepared from solutions having a pH between 6.5 and 7.4. These transparent gels shrink and crack upon simple evaporative drying and therefore are typically dried by supercritical extraction with carbon dioxide.

In contrast, it is known that RF gels prepared at low catalyst concentration (R/C>900) are opaque due to the formation of large particles and pore spaces. In a patent by Droege (1999) it was shown that gels prepared with R/C of approximately 1000 and a pH of approximately 6 produces opaque gels that can withstand simple evaporative drying and the carbon derived from carbonizing this polymer has some mesopores. Tamon et al. (1998) showed that by adjusting R/C and the amount of water they could make mesoporous carbons, but their methods can only prepare carbons with mesopores in the range of 2 to 6 nm. (Tamon et al. 1998). For a general discussion on resorcinol, see Dressler, H. (1994). Both references are hereby incorporated by reference.

In view of this, and the known drawbacks of the prior art, it is desired to provide an improved mesoporous polymer and carbon structure requiring neither supercritical fluid extraction nor surfactants. The polymer structure should be simple and inexpensive to manufacture and should have a high pore volume and a high fraction of mesopores. When intended for use as electrodes for ultracapacitors, the desired carbon structure should have high gravimetric and volumetric capacitance.

BRIEF SUMMARY OF THE PREFERRED EMBODIMENTS

The preferred embodiments of the present invention comprise mesoporous polymer materials and mesoporous carbon materials derived from said polymer materials that are suitable for use as catalyst supports, sorbents and chromatographic packings. In electrical applications, the present carbons can be used as electrodes in double-layer capacitors. The preferred embodiments of the present invention further comprise a method for making the novel mesoporous materials.

The preferred embodiments of the present invention comprise polymer and carbon structures that have high mesoporosity, and are simple and inexpensive to manufacture. The present invention also comprises carbon structures having a relatively narrow pore size distribution in which the pores are large enough for an electrolyte solution to easily enter. Hence, the present carbon structures provide more wetted carbon surface. When used in electrical applications such as capacitors, this increased wetted surface allows a fully charged double layer to develop and therefore improves volumetric capacitance. The present carbons can be prepared as monoliths (offering increased density and conductivity as compared to compact products) or as powder based electrodes formed by pressing together a mass of carbon particles with a suitable binder.

The preferred embodiments of the present invention also comprise a novel method for preparing mesoporous polymers and carbons that does not require surfactant, catalyst or supercritical fluid extraction. The method employs one or more hydroxylated benzenes (such as phenol, catechol, resorcinol, phloroglucinol and aminophenol), one or more aldehydes (such as formaldehyde and benzaldehyde), and water to create a mesoporous polymer. Polymerizing at low pH and adjusting the water concentration establish control over pore size. By adjusting the initial formulation, polymers and their subsequent carbons can be prepared with a narrow distribution of mesopores.

The polymer formed in this manner may be pyrolyzed to give a monolithic or powdered porous carbon structure, which can then optionally be activated to increase the fraction of mesopores therein. The present method yields a mesoporous carbon that has many desired properties.

The preferred embodiments of the present invention additionally comprise a novel capacitor, catalyst support, sorbent and chromatographic substrate prepared from the mesoporous carbons and polymers disclosed in this application.

BRIEF DESCRIPTION OF THE DRAWINGS

For a more detailed description of the present invention, reference will now be made to the accompanying Figures, wherein.

DETAILED DESCRIPTION OF THE INVENTION

To address the shortcomings of the prior art, we have developed low-cost mesoporous polymers and carbons and a method for making same. While the present carbons can be used advantageously in a variety of applications, including in particular liquid phase, surface-limited reactions, they are particularly suited for use as thin film electrodes in ultracapacitors. These materials are made from inexpensive materials and do not require expensive and time-consuming manufacturing processes.

Material Composition

The polymer preferably has pore sizes between 2–1000 nm, a density of 0.1 to 1.0 g/cc, and a surface area between 50–500 m$^2$/g. More preferably, the polymer has pore sizes between 10 and 28 nm. For purposes of experimentation, the well-known resorcinol/formaldehyde (RF) composition was used and is discussed below. One skilled in the art will understand that references herein to an RF system are exemplary only, and that the present invention can be practiced with a range of hydroxylated benzene/aldehyde polymer systems, including but not limited to the following: phloroglucinol/resorcinol/formaldehyde, hydroquinone/resorcinol/formaldehyde, catechol/resorcinol/formaldehyde, phenol/formaldehyde, epoxidized phenol/formaldehyde, and phenol/benzaldehyde. In addition, the present invention encompasses other aqueous polymer systems in which pH controls the reaction rate such as melamine/formaldehyde and urea/formaldehyde polymer systems.

Experimental Procedure

Figure 1:
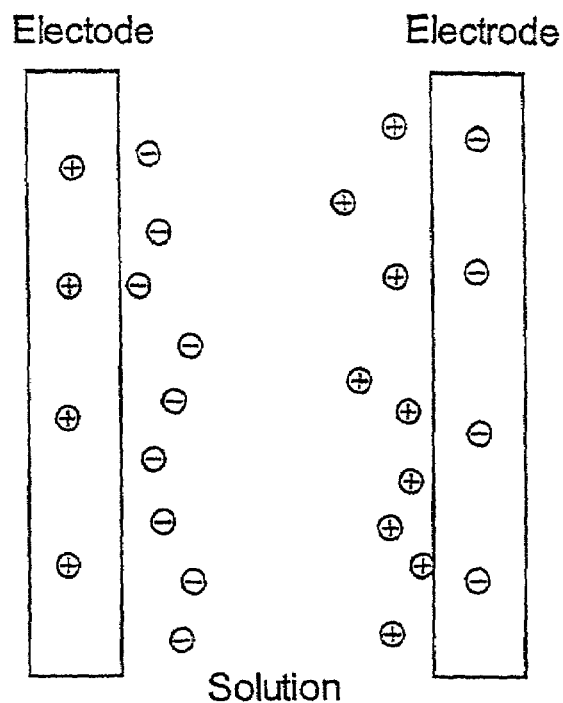
FIG. 1 is an illustration of a charged double layer at a solid/liquid/solid interface.
Figure 2:
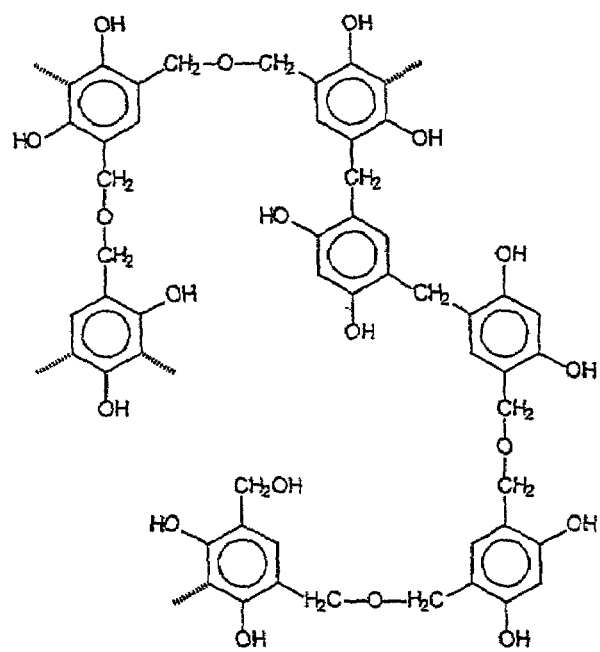
FIG. 2 is a schematic theoretical representation of the structure of an RF polymer.

RF gels were prepared under acidic conditions in the presence of varying concentrations of water to test the effect of water concentration in controlling mesopore formation and size. In this polymerization, resorcinol serves as a tri-functional monomer capable of adding formaldehyde in the 2, 4, and 6 positions of the resorcinol aromatic ring. This monomer is particularly reactive because of the electron-donating effects of the attached hydroxyl groups. The substituted resorcinol rings condense with each other to form 30–200 angstrom clusters in solution. The resulting structure is shown in FIG. 2.

According to one preferred embodiment, a mesoporous polymer is formed by polymerizing a mixture of resorcinol and formaldehyde (RF) under acidic conditions in aqueous media. Unlike the prior art, no catalyst is added. Commercial aqueous solutions of formaldehyde typically contain a small amount (0.02 to 0.05 wt. %) of formic acid that lowers the pH of the solution to approximately pH 3 to 4, which is a desirable value to produce polymers and carbons of the present invention. The pH of the solution can readily be adjusted to the desired value by addition of a strong acid. This result is contrary to prior art in the polymerization of hydroxylated benzene with formaldehyde; for example, Dressler (1994; p 86) shows that the reaction of resorcinol and formaldehyde in aqueous solution occurs at a good rate even in neutral solution, is accelerated at alkaline conditions, shows a minimum at pH 3.5, with the reaction rate accelerating again at lower pH.

The RF polymers were prepared by mixing a 2:1 molar ratio of formaldehyde to resorcinol. The formaldehyde was added as a 37 weight percent aqueous solution. In the first sample, no additional water was added. Thus, the water present in the first sample was due exclusively to the aqueous formaldehyde solution. In subsequent samples, small amounts of excess water were added. The acidity of the solutions was approximately pH 3. To prepare the mesoporous carbons, the polymers were heated under an inert atmosphere (e.g., nitrogen or argon). Polymers were heated from ambient temperature to 900–1000° C. at a ramp rate of between 1 and 20° C./minute and held at the final temperature for 2 hours. This step carbonizes the polymer. Preferably, the carbons possess pore sizes between 10 and 28 nm. Heating in carbon dioxide or steam at or above 850° C. can further increase the surface area until the desired surface area is reached.

Materials produced in this manner have a number of interesting properties. Under the conditions disclosed, the RF solutions form a gel almost as rapidly as RF solutions using an added catalyst. Second, gels prepared without any additional water—i.e., without any water over and above the amount provided by the 37 weight percent formaldehyde solution—are transparent and shrink about 20 percent by volume when dried by simple evaporative drying (e.g., at 110° C. for 4 hours). In contrast, when excess water is added to the RF solution, the gels become opaque (indicating the presence of larger particles and pores) and shrink less than 5 percent by volume when dried. Carbons derived from these gels have distinct mesopores.

Figure 3:
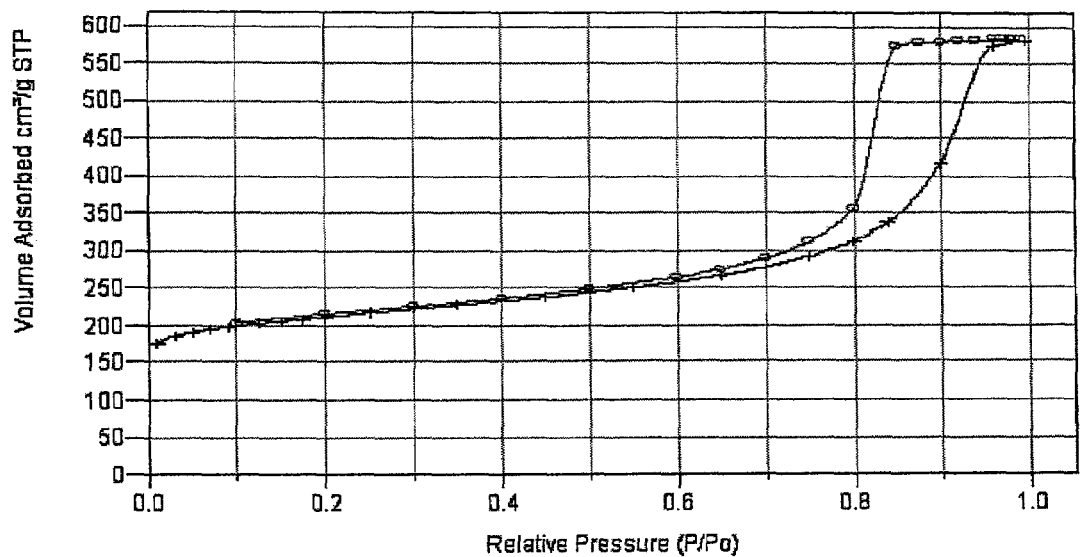
FIGS. 3 and 4 are plots of various properties of a mesoporous carbon formed in accordance with the present invention.
Figure 4:
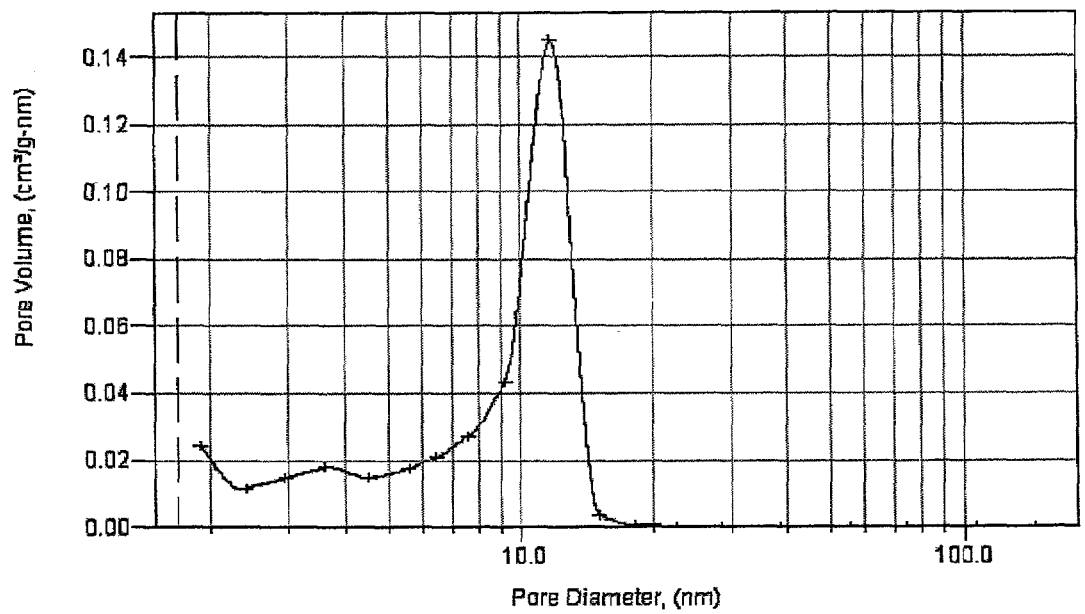

The specific surface area and the pore size distribution of carbons prepared in this manner were analyzed by nitrogen adsorption on a Micromeritics Gemini instrument. FIG. 3 shows the nitrogen isotherm of one of the samples. The isotherm is a Type 4 that is characteristic for mesoporous solids (Gregg and Sing 1982). FIG. 4 shows a distinct mesopore centered at 12 nm, as calculated by the BJH method (Barrett et al. 1951). Typically greater than 80% of the pore volume is in the mesopore range.

Table 1. Formulation and Properties of TDA'RF Porous Carbons

TABLE 1

Formulation and properties of TDA's RF porous carbons.

| Weight Ratio (water/resorcinol) | Mesopore Sizes (nm) | Total Pore Volume ($cm^3/g$) | Mesopore Volume ($cm^3/g$) | Total Surface Area ($m^2/g$) |
| --- | --- | --- | --- | --- |
| 0.38 | 12 | 0.90 | 0.73 | 674 |
| 0.60 | 18 | 1.18 | 1.00 | 661 |
| 0.88 | 28 | 1.11 | 0.95 | 583 |

Figure 5:
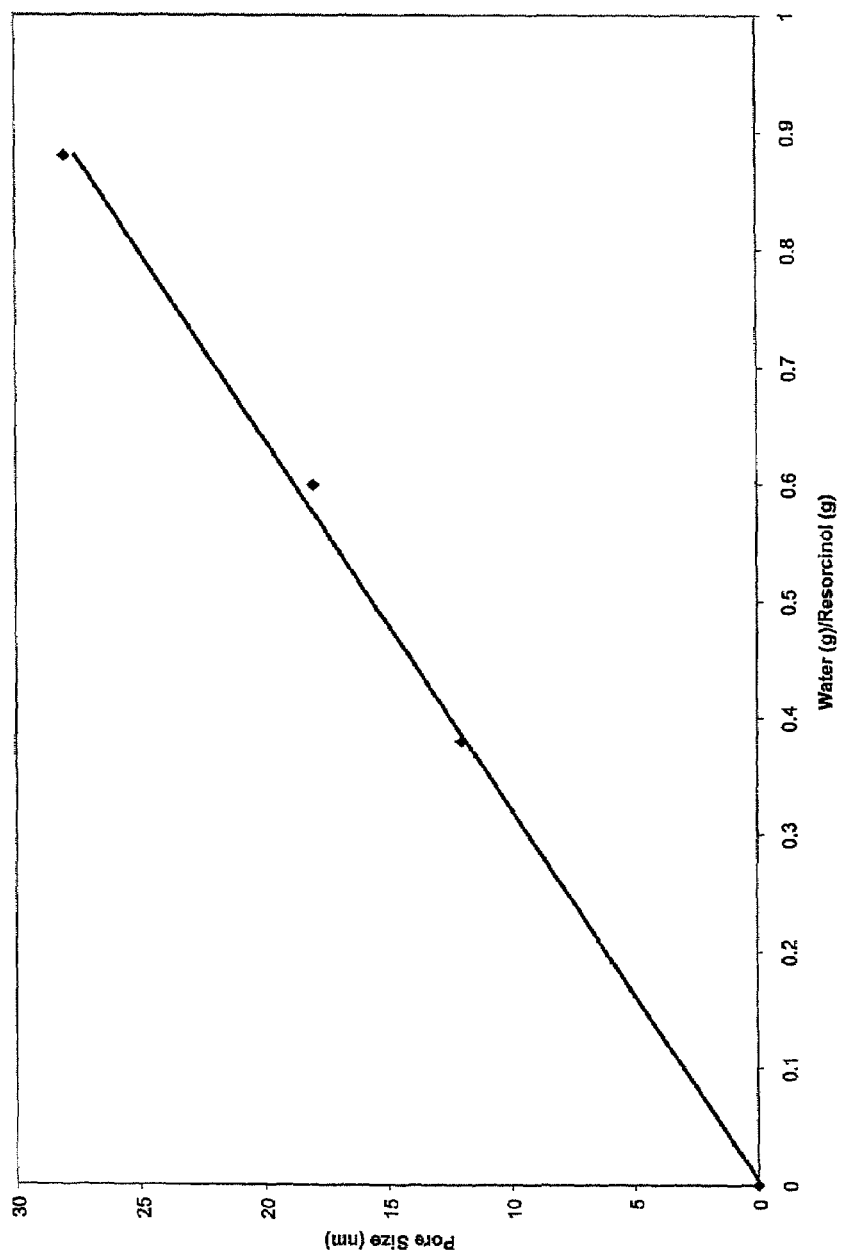
FIG. 5 is a graph showing pore size as a function of excess water to resorcinol.

The properties of several RF derived carbons are shown in Table 1. If no excess water is added, carbons derived from these gels have low surface areas and no measurable mesopores. However, when excess water is added, the surface areas increase dramatically and the resulting carbons evidence mesopores. From this data, it is clear that the amount of excess water (i.e., water added in addition to that in the 37 weight percent formaldehyde solution) has a profound effect on the pore sizes. In fact, as shown in FIG. 5, the mesopore size can be controlled in a very predictable and linear manner simply by adjusting the excess water to resorcinol weight ratio.

EXAMPLE 1

The second formulation (W/R=0.60) from Table 1 is used as an example. Resorcinol (2.5 g, 0.023 moles) is mixed with 3.4 mL (0.045 moles) of formaldehyde in the form of a 37 weight percent aqueous solution of formaldehyde. To this is added 1.5 mL of water. The acidity of the final solution is pH 3. The aqueous solution was then added to a Teflon lined mold that was sealed to prevent evaporation. The solution was gelled by heating at 70° C. for 24 hours. The resulting polymer was removed from the mold and dried (simple evaporative drying at 110° C. for 4 hours) to remove the water. This polymer has a BET surface area of 256 $m^2/g$, a mesopore distribution centered at 23 nm and a mesopore volume of 1 cc/g. Because the present polymers are intended for use as carbons in ultracapacitors, the sample preparation method included an additional step in which the polymer is carbonized by pyrolysis under an inert atmosphere (nitrogen or argon), heating from ambient temperature to 900° C. for 2 hours at a ramp rate of 10° C./minute and holding at the final temperature for 2 hours. The resulting carbon is obtained in a yield of 1.2 g. This sample has a mesopore distribution centered at 18 nm and a BET surface area of 661 $m^2/g$.

EXAMPLE 2

An example of a formulation in which half of the resorcinol is replaced by phenol is prepared by mixing resorcinol (1.7 g, 0.015 moles), phenol (1.5 g, 0.015 moles) and 4.6 mL of 37 weight percent formaldehyde (0.060 moles). To this is added 1.5 mL of water. The acidity of the final solution is pH 2. The solution was gelled by heating at 70° C. for 24 hours. The gelled polymer is removed from the mold and dried to remove the water. The polymer is carbonized by pyrolysis under an inert atmosphere (nitrogen or argon), heating from ambient temperature to 900° C. for 2 hours at a ramp rate of 10° C./min. The yield is 1.5 g. This sample has a BET surface area of 600 m²/g and a mesopore distribution centered at 22 nm.

Formation Mechanism

According to the present invention, it is possible to prepare carbons having variable pore sizes that depend upon the initial formulation. Previously, we observed that RF gels with small pore sizes were transparent, whereas the gels of large pore carbons were opaque. Thus, preparative conditions resulting in opaqueness appear to indicate the formation of mesopores.

The acidic conditions under which the polymerization occurred results in larger particles with larger pore sizes than are achieved under the traditionally basic conditions for RF polymerization. Without limiting the scope of the invention, one possible mechanistic explanation for the formation of larger pores under these acidic conditions involves the difference in polymerization rates and resulting particle sizes. Just as a stack of bowling balls would give larger crevices than a stack of golf balls, so too would a mass of larger polymer particles be expected to yield larger pores between particles. Thus, one aspect of the present invention is the use of pH to control the size of polymer particles and the corresponding size of the pores between them. The role of additional water in increasing the mesopore size is not entirely clear at this time. However, it seems plausible that the water acts in the emulsion to increase the void volume in the gelled product in a manner similar to that played by the micelles in our earlier work. Under this theory, additional water increases the void volume in the growing polymer thereby increasing pore size.

Irrespective of the exact mechanism of mesopore formation, in the preferred embodiments of the present invention, controlling the amount of additional water can be used to control the pore size in the resulting polymers and carbons. The preferred embodiments of the present invention therefore provide an inexpensive route to high surface area mesoporous polymers by avoiding the need for surfactants and for supercritical fluid extraction. However, nothing in the preferred embodiments of the present invention precludes the use of surfactants or supercritical fluid extraction and the present invention might also be practiced successfully using either or both of these. This technique also allows control over the pore size of the resultant carbon in the mesopore range, a result that has not been possible without the use of surfactants.

Although the polymers prepared according to the above method have all been prepared from resorcinol and formaldehyde, it is anticipated that similar behavior will be observed for other members of the hydroxylated benzene/aldehyde polymer family polymerized by the same mechanism, and that the same conditions could also be used to produce useful polymers and carbons from these materials. Consequently, the use of RF gels in the present experiments is not intended to limit the invention to the RF system. Furthermore, the benefits of the present invention are expected to extend to any polymer system in which pH controls the polymerization rate and the size of the polymer particles. By way of example only, the present invention encompasses melamine/formaldehyde and urea/formaldehyde polymer systems because pH controls the polymerization rate of these systems in aqueous solution.

Activation

To further increase the surface area of the materials, the samples can be activated. When samples are activated, they are heated at high temperature, most commonly in the presence of carbon dioxide, steam or aqueous base (Kinoshita 1988). This is a known method for preparing high surface area carbons. As discussed above, increasing the surface area of the carbon structure improves the efficacy of the material in a variety of applications, including sorbent, catalysis, and electrical applications. Carbon dioxide reacts with free carbon sites ($C_f$) according to the equation:

$$CO_2 + C_f \rightleftharpoons CO(g) + (CO)$$

The surface complex (CO) desorbs as CO leaving a new free carbon site.

$$(CO) \rightarrow CO(g) + C_f$$

Oxidation by carbon dioxide can increase the mesoporosity and surface area of the carbon, but the nature of the carbon precursor determines to a large extent the final pore texture. For relatively nonporous carbons, such as graphites, only a small increase in surface area is evident, with an increase in burnoff due to the unavailability of pores that provide additional surface area. For a carbon such as the present mesoporous carbons, which contain fine pores, the surface area increases dramatically with $CO_2$ activation. This new surface area is only exposed by the gaseous activation and is not created by it.

Figure 6:
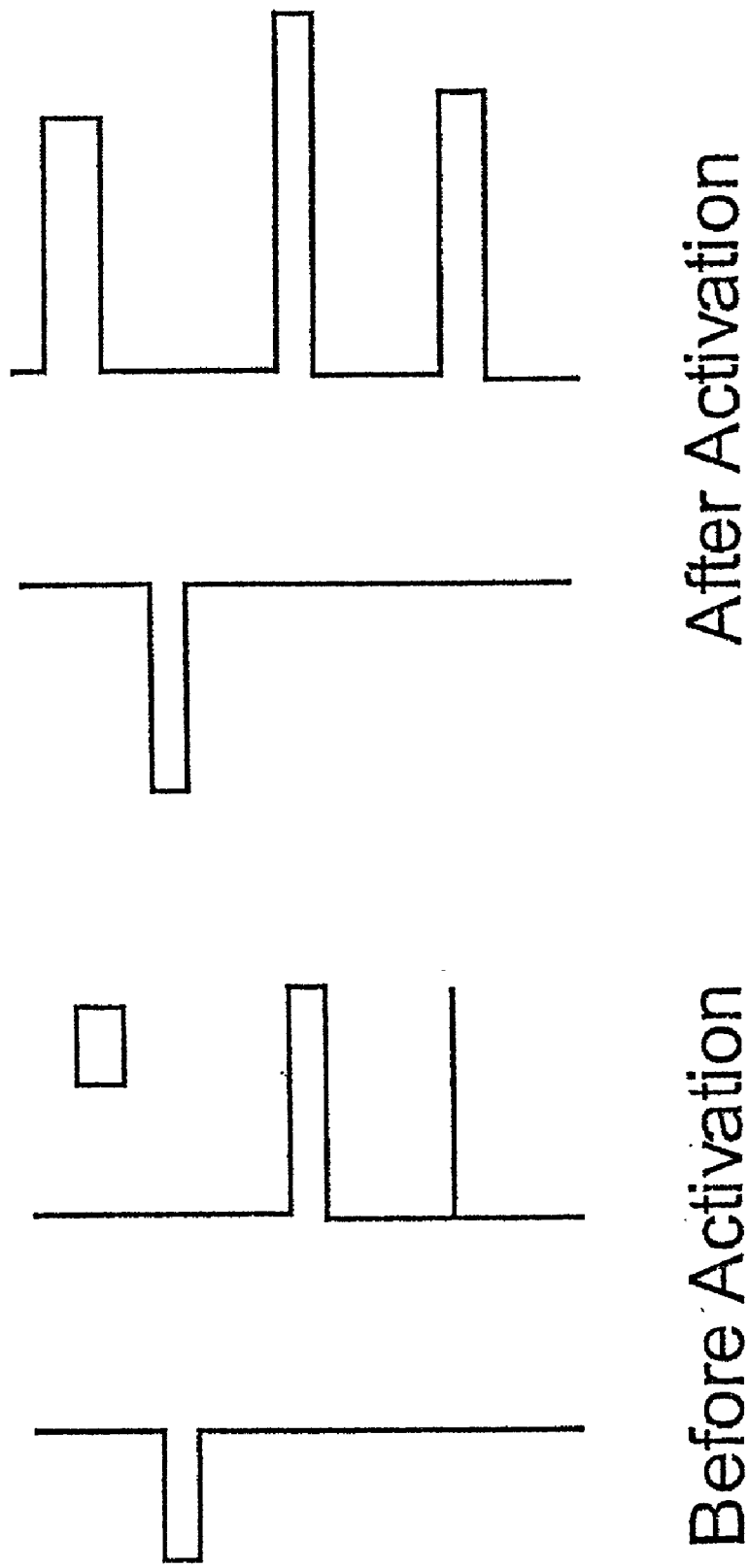
FIG. 6 is a representation of the change in the structure of a porous carbon before and after activation.

As illustrated in FIG. 6, activation can increase surface area by opening up closed pores and extending the length of existing pores.

Capacitor Preparation

Figure 7:
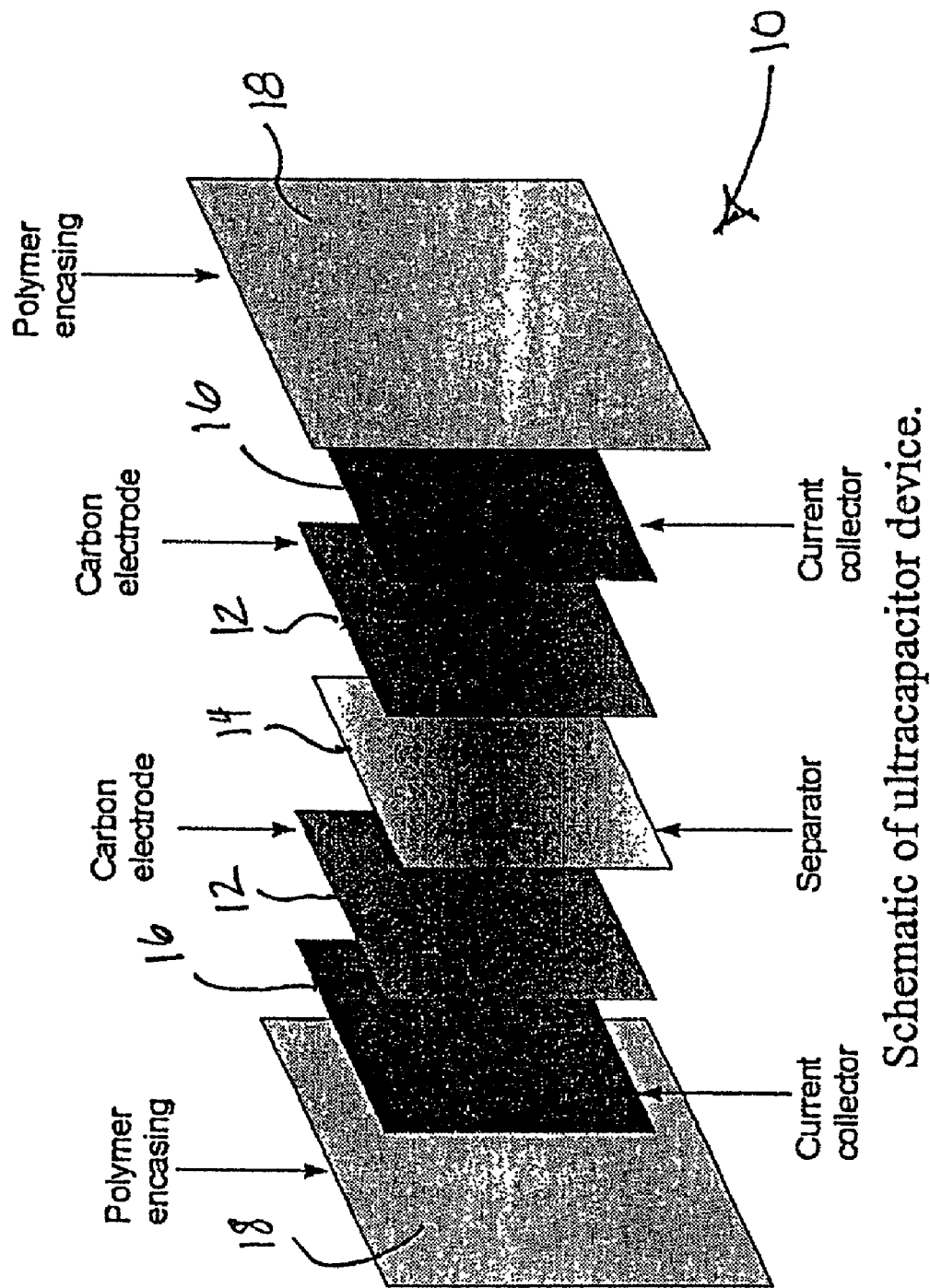
FIG. 7 is a schematic diagram of an ultracapacitor device.

According to one preferred embodiment, carbon electrodes for capacitors are prepared by casting thin films of the present polymer solution between two Teflon covered flat aluminum plates with a thin silicone gasket around the edges. After curing (80° C., 16 h), the polymer film can be cut into any desired shape with a high-speed blade or if the film is thin enough, it can be cut with, for example, scissors. After pyrolysis, this procedure yields single-piece carbon electrodes of any desired dimensions. For example, electrodes 0.2 mm thick are readily prepared The preferred thin film carbon electrodes according to this process, in the form of thin film or powder compacts, can in turn be used in the assembly of a capacitor. For example, according to the preferred embodiment illustrated in FIG. 7, an ultracapacitor 10 consists of two or more pairs of the mesoporous carbon electrodes 12 separated by a porous, electrically insulating material 14. Current collectors 16 supply electrical contacts to the electrodes to provide electrical connection to the voltage source (not shown). The preferred carbon pore size will depend on the electrolyte that is used. The components are preferably sealed in a polymeric housing or package 18. An example of a suitable device comprises electrodes made from the present carbon film, a glass fiber paper separator, and aluminum foil current collectors, with a liquid electrolyte (0.65 M $NEt_4BF_4$ in propylene carbonate), sealed in a metallized film bag. After the electrodes, separator and electrolyte are placed in the bag, it can be sealed with epoxy.

Conclusions

In sum, the preferred embodiments of the present invention are capable of producing mesoporous polymers of controlled pore size. By adjusting the proportion of water, it is possible to control the mesopore size, thereby allowing for the preparation of tailored mesoporous polymers. These polymers can then be pyrolyzed to produce monolithic and particulate carbons that contain mesopores that provide the necessary surface area for a variety of applications.

Using the present technology, it is also possible to prepare monolithic and particulate polymers with the desired pore size distribution for high-throughput chromatography, sorbent and catalyst support applications, as well as for ultracapacitor electrode technology.

What is claimed is:

1. A method for preparing a mesoporous polymer, comprising the steps of:
   (a) providing a solution containing a solvent and one or more polymerizable organic compounds whose polymerization rate depends on pH;
   (b) controlling the average polymer particle size primarily by controlling the pH of the solution; and
   (c) manipulating the pore size in the polymer primarily by adjusting the solvent concentration.

2. The method according to claim 1, further including the step of drying the porous polymer to produce a dried porous polymer.

3. The method according to claim 1, further including the step of controlling the composition of the solution so as to produce a mesoporous polymer having a pore size between 2 and 50 nm.

4. The method according to claim 1, further including the step of controlling the composition of the solution so as to produce a mesoporous polymer having a pore size between 10 and 28 nm.

5. The method according to claim 1, wherein the pH of the solution is less than 6.5.

6. The method according to claim 1 wherein said solution is essentially free of catalyst.

7. The method according to claim 1 wherein said solution is essentially free of surfactant.

8. The method according to claim 1 wherein pH of the solution is less than 6.5 and the solution is essentially free of surfactant.

9. A method for preparing a mesoporous carbon, comprising the steps of:
   (a) providing a solution containing a solvent and one or more polymerizable organic compounds whose polymerization rate depends on pH;
   (b) controlling the average polymer particle size primarily by controlling the pH of the solution;
   (c) manipulating the pore size in the polymer by adjusting the solvent concentration; and
   (d) pyrolyzing the porous polymer to form a porous carbon.

10. The method according to claim 9, further including the step of activating the porous carbon so as to increase its capacitance when used wit an electrolyte.

11. The method according to claim 9, further including the step of activating the porous carbon, wherein the activation is carried out at between 500° C. and 1200° C.

12. The method according to claim 9, further including the step of controlling the composition of the solution so as to produce a mesoporous carbon having a pore size between 2 and 50 nm.

13. The method according to claim 9, further including the step of controlling the composition of the solution so as to produce a mesoporous carbon having a pore size between 10 and 28 nm.

14. The method according to claim 9, wherein the pH of the solution is less than 6.5.

15. The method according to claim 9 wherein the solution is essentially free of catalyst.

16. The method according to claim 9 wherein the solution is essentially free of surfactant.

17. The method according to claim 9 wherein the pH of the solution is less than 6.5 and the solution is essentially free of surfactant.

18. A method for preparing a mesoporous polymer, comprising the steps of:
   a) providing an aqueous acidic solution containing one or more polymerizable organic compounds; and
   b) polymerizing the polymerizable organic compounds;
      wherein step b) includes controlling the average polymer particle size primarily by controlling the pH of the solution and controlling the pore size in the polymer primarily by adjusting the ratio of water to polymerizable organic compounds.

19. The method according to claim 18 wherein one of the polymerizable organic compounds comprises a hydroxylated benzene.

20. The method according to claim 18, further including the step of drying the porous polymer to produce a dried porous polymer.

21. The method according to claim 18 wherein step b) is carded out so as to produce a mesoporous polymer having a pore size between 2 and 50 nm..

22. The method according to claim 18 wherein step b) is carried out so as to produce a mesoporous polymer having a pore size between 10 and 28 nm.

23. A method for preparing a mesoporous carbon, comprising the steps of:
   a) providing an aqueous acidic solution containing one or more polymerizable organic compounds;
   b) polymerizing the polymerizable organic compounds;
      wherein step b) includes controlling the average polymer particle size primarily by controlling the pH of the solution and controlling the pore size in the polymer primarily by adjusting the ratio of water to polymerizable organic compounds; and
   c) pyrolyzing the porous polymer to form a porous carbon.

24. The method according to claim 23 wherein one of the polymerizable organic compounds comprises a hydroxylated benzene.

25. The method according to claim 23, further including the step of activating the porous carbon so as to increase its capacitance when used with an electrolyte.

26. The method according to claim 23, further including the step of activating the porous carbon, wherein the activation is carried out at between 500° C. and 1200° C.

27. The method according to claim 23, further including the step of controlling the composition of the solution so as to produce a mesoporous carbon having a pore size between 2 and 50 mm.

28. The method according to claim 23, further including the step of controlling the composition of the solution so as to produce a mesoporous carbon having a pore size between 10 and 28 nm.

* * * * *